US011891117B2

(12) United States Patent
Bittroff (10) Patent No.: US 11,891,117 B2
(45) Date of Patent: Feb. 6, 2024

(54) STEERING CONTROL SYSTEM OF A MULTI-UNIT VEHICLE

(71) Applicant: Hübner GmbH & Co. KG, Kassel (DE)

(72) Inventor: Uwe Bittroff, Vellmar (DE)

(73) Assignee: HÜBNER GMBH & CO. KG, Kassel (DE)

(*) Notice: Subject to any disclaimer, the term of this patent is extended or adjusted under 35 U.S.C. 154(b) by 205 days.

(21) Appl. No.: 17/500,045

(22) Filed: Oct. 13, 2021

(65) Prior Publication Data

US 2022/0111893 A1 Apr. 14, 2022

(30) Foreign Application Priority Data

Oct. 14, 2020 (EP) .................................... 20201752

(51) Int. Cl.
*B62D 12/00* (2006.01)
*B62D 7/02* (2006.01)
*B62D 7/15* (2006.01)
*B62D 47/02* (2006.01)
*B62D 53/00* (2006.01)

(52) U.S. Cl.
CPC .............. *B62D 12/00* (2013.01); *B62D 7/026* (2013.01); *B62D 7/1509* (2013.01); *B62D 47/025* (2013.01); *B62D 53/005* (2013.01)

(58) Field of Classification Search
CPC ...... B62D 7/026; B62D 7/1509; B62D 12/00; B62D 47/025; B62D 53/005
See application file for complete search history.

(56) References Cited

U.S. PATENT DOCUMENTS

| 6,059,056 A * | 5/2000 | Becker ................. B62D 7/1536 180/410 |
| 7,949,447 B2 * | 5/2011 | DeMong ................. B62D 13/04 280/411.1 |
| 9,037,322 B2 * | 5/2015 | Fortin .................... B62D 12/00 701/19 |
| 11,535,314 B2 * | 12/2022 | Gecchelin ............ G05D 1/0088 |

(Continued)

FOREIGN PATENT DOCUMENTS

| DE | 102006037588 A1 | 2/2008 | |
| DE | 102010027118 A1 * | 1/2012 | ........... B62D 15/021 |

(Continued)

*Primary Examiner* — Tony H Winner
*Assistant Examiner* — Hosam Shabara
(74) *Attorney, Agent, or Firm* — Dinsmore & Shohl LLP (57) ABSTRACT

A steering control unit and to a method of controlling the steering of a multi-unit vehicle is provided, the vehicle having a plurality of vehicle parts movably connected to one another and a plurality of steerable axle units. A first axle control unit is in conjunction with a first steerable axle unit and at least one second axle control unit is in conjunction with at least one second steerable axle unit. The steering control system has a central control module that is connected to the axle control units via a common data line for exchange of steering angle data. The axle control units have data interfaces for communication via the data line. The data interfaces transfer mutually identical data formats, whereby the steering control system is set up in a modular manner with a variable number of axle control units that can be integrated.

15 Claims, 3 Drawing Sheets

(56) References Cited

U.S. PATENT DOCUMENTS

2006/0237242 A1\* 10/2006 Burke .................. B62D 31/025
  180/65.265
2013/0187361 A1   7/2013 Fortin et al.
2018/0022405 A1   1/2018 Gecchelin et al.

FOREIGN PATENT DOCUMENTS

| DE | 102010027118 A1 | | 1/2012 | |
|----|-----------------|---|--------|---|
| DE | 102017112183 A1 | | 12/2018 | |
| EP | 1847442 A2 | \* | 10/2007 | ............. B62D 13/00 |
| EP | 1847442 A2 | | 10/2007 | |
| EP | 3363274 A1 | | 8/2018 | |

\* cited by examiner

STEERING CONTROL SYSTEM OF A MULTI-UNIT VEHICLE

CROSS-REFERENCE TO RELATED APPLICATIONS

This application claims priority to European application number 20201752.1 filed Oct. 14, 2020, the disclosure of which is hereby incorporated by reference in its entirety.

FIELD OF THE INVENTION

The invention relates to a steering control system for controlling the steering of a multi-unit vehicle having a plurality of vehicle parts movably connected to one another. The steering control system accordingly has a first axle control system for arrangement in conjunction with a first steerable axle unit and has at least one second axle control unit for arrangement in conjunction with at least one second steerable axle unit. The invention further relates to a multi-unit vehicle having a plurality of vehicle parts movably connected to one another, a plurality of steerable axle units, and such a steering control system. The invention finally relates to a method of setting up a steering control system.

BACKGROUND OF THE INVENTION

A steering control system is known from document DE 10 2017 112 183 A1 for steering at least one rear axle of a multi-unit vehicle having a first control device, wherein the first control device has a first input interface for taking over a front axle steering angle datum of the vehicle and a vehicle speed datum of the vehicle, with the first control device having a desired value module for determining a first desired rear axle steering angle datum on the basis of the vehicle speed datum and the front axle steering angle datum. A second control device is furthermore provided, wherein the second control device has a second input interface for taking over the front axle steering angle datum and the vehicle speed datum, with the second control device forming a parallel module for determining a second desired rear axle steering angle datum on the basis of the vehicle speed datum and the front axle steering angle datum. A control setup that is split axle-wise and that can be expanded in a modular manner is not possible due to the rigid setup.

A method of multiaxial steering for multi-unit road vehicles is known from DE 10 2006 037 588 A1 having a plurality of steerable axle units via emitted control signals by means of a steering control system. Vehicle parameters measured online such as the vehicle speed and the desired route trajectory are included in the calculation of the control signals.

The cross-track errors between the desired route trajectory and the actual vehicle position that are unavoidable due to interference or other influences and that are described by the location of the centers of the steering axles are measured and are corrected by subordinate feedback loops at each steering axle. The rigid and non-expandable arrangement of the components of a plurality of superordinated and subordinated control members is disadvantageous in the setup shown.

SUMMARY OF THE INVENTION

It is the object of the invention to provide a steering control system for controlling the steering of a multi-unit vehicle having a plurality of vehicle parts movably connected to one another and having a plurality of steerable axle units of the steering of a multi-unit vehicle that is flexible with respect to applicability, in particular without hereby increasing the overall complexity of the system and/or having to accept compromises with respect to the precision and/or safety of the steering control. A steering control system should in particular be provided that has a modular setup and that can be used for vehicles having selectively more or fewer axle units.

The object in accordance with the invention is achieved by a system having as described herein. The object in accordance with the invention is further achieved by a multi-unit vehicle and by a method of setting up a steering control system as described herein.

It has been recognized in accordance with the invention that on the construction of so-called streetcars on wheels, steering control systems are required that can individually control the axle control units at the steerable axle units so that this axle unit adopts the steering angle position correct for a trajectory to be traveled. The axle control unit of each of the controlled axle units has to be supplied with specifically calculated steering angle data for this purpose, with current axle information simultaneously being transmitted to a control from the axles. In this respect, a steering control system should be provided that can be put into operation independently of the number of steerable axle units and without any greater adaptation effort for streetcars on wheels having different lengths and having a variable number of vehicle parts. There are in particular regionally very different demands on streetcars, with the demands also being able to differ in dependence on the route or in dependence on the time of day. A high degree of flexibility is therefore in particular necessary for such vehicle systems. Precisely this flexibility can be ensured with the steering control system in accordance with the invention, in particular without restricting vehicle safety.

Provision is made in accordance with the invention that the steering control system has a central control module that is connected to the plurality of axle control units via a common data line for the exchange of steering angle data, with the axle control units having data interfaces for communication via the data line, said data interfaces being configured for the transfer of mutually identical data formats, whereby the steering control system can be set up in a modular manner with a variable number of axle control units that can be integrated.

The advantage is provided by the steering control system developed further in accordance with the invention that the major control work can be worked through locally in the central control module, while the axle control units that are arranged in conjunction with the axle units substantially work through peripheral information that are required directly with the sensor system and actuator system of the axle unit itself. The actual control information can thus be generated in the central control module to finally supply the axle control units with the steering information. At the same time, the respective current control information can be transmitted to the central control module by the axle control units.

The substantial advantage is also achieved in that the axle control units can be operated independently of one another since they substantially only still exchange data with the central control module so that how many axle control units are finally integrated in the system is irrelevant for the function of the steering control system. In other words, in the simplest case, a steering control system in accordance with the invention can be set up from a central control module and one or more axle control units that are each associated with a respective axle. To provide this comparatively simple architecture within the steering control system, the data interfaces of the axle control units are in particular configured as the same as or identical to one another so that the central control module does not have to be adapted to the number of axle units. The data exchange of the central control module with the axle control units can take place in a standardized manner such that the steering control system can expanded as desired or can be reproduced as desired in relation to the number of axle control units. The data interfaces in particular do not require any associated slots in a technical mechanical respect or any separately associated programming in an electrical respect due to their design, that is the same as one another, in conjunction with the data line and in particular in conjunction with the central control module.

The data interfaces that are designed as the same as one another in accordance with the invention are designed such that the data formats of the data interfaces of the plurality of axle control units can be read by every single axle control unit. In this respect, individual data interfaces or all the data interfaces can be designed the same and in particular as identical. I.e. the data interfaces of the plurality of axle control units can be configured as the same or as identical in a construction, geometrical, mechanical, electrical, and/or informatory respect. E.g. the data interfaces can have the same pin assignment of a plug unit and can have a geometry that is the same, in particular identical among one another so that the plug units are exchangeable among one another. The identity of the data interfaces among one another is, however, in particular provided in an electrical manner so that the plurality of data interfaces of the plurality of axle control units can each exchange mutually identical data formats with the central control module. The modular setup of the steering control system with a variable number of axle control units having a correspondingly variable number of axle units is thus made possible. A vehicle having a different number of vehicle parts can consequently be set up and vehicle parts can be removed or added without any great effort to be able to adapt the streetcar on wheels, for example, to a current transportation requirement at short notice.

In accordance with an embodiment, the axle control units are configured as identical to one another in a construction, geometrical, mechanical, electrical, and/or informatory respect. The axle control units can to this extent be used with respect to a vehicle direction of travel for a frontmost axle unit, for a middle axle unit, or for a rear axle unit and the axle unit is in particular actively connected in an articulated manner. The axle unit can also be provided with a steering unit that is e.g. controlled by a driver or by an autonomous driving device of the vehicle. The axle control unit of such an axle unit with a steering unit can be configured as identical to axle control units without a steering unit in one of the above-named manners. The axle control unit of an axle unit with a steering unit can, however, also comprise additional functions. These additional functions can here in particular be selectively activated or deactivated, e.g. in dependence on whether the axle unit is to act as an axle unit with or without a steering unit.

In accordance with an embodiment of the steering control system, axle-specific actual steering angle data are transmitted from every axle control unit to the central control module and/or axle-specific desired steering angle data are transmitted from the central control module to each of the axle control units. In accordance with a particularly advantageous aspect of the invention, predominantly or exclusively steering angle information is generally exchanged over the data lines, that is in particular the actual steering angle data from the axle control units to the central control module and/or the desired steering angle data from the central control module to the axle control units. Coordinated data or information can naturally also be communicated, in particular when the communication system via the data line is based on a bus system and the individual axle control units have to be addressed with these associated data sequences.

The central control module can have a control interface via which travel data of the vehicle are transmitted to the central control module, with the travel data comprising at least a vehicle speed, a direction of travel, and/or steering information. The steering information can in particular be provided from a steering device by an operator and/or from an autonomous driving device of the vehicle. The actuation of the axle control units by the central control unit in particular takes place here on the basis of and/or in dependence on the travel data that are uploaded from the vehicle to the central control module via the control interface. For example, a steering angle adjustment calculated using the central control module is smaller at larger travel speeds than at low travel speeds.

The steering information can be uploaded from a steering device, with a steer-by-wire system in particular being able to be used by means of which an operator of the vehicle controls a steering wheel. In this respect, the steering information is provided as steering information by means of a steering detection sensor and is supplied to the central control module via the control interface. In this respect, the steering information that a driver or an autonomous driving device specifies can be tapped at an axle unit itself. In accordance with an embodiment, this steering information is first communicated to the central control module to finally steer the axle unit at which the steering device is arranged. The further axles are controlled in the same manner using corresponding information. In other words, a multi-unit vehicle in this embodiment is no longer steered at, for example, a front axle unit by an operator or by an autonomous driving device by means of steering information, but the steering information rather reaches every single axle unit via the central control module so that a calculated steering lock is carried out by the central control module for every axle unit based on the steering information. It is, however, also possible that the steering information is directly processed by the corresponding axle control unit of the axle unit having the steering device and this axle unit is steered directly in accordance with the steering information. At the same time, the steering information is communicated to the central control module that likewise processes the steering information and outputs corresponding steering angle data to the other axle control units. In accordance with a further possibility, the steering information can also be directly supplied to the central control module by a steer-by-wire system or a steering wheel. The central control module processes the steering angle information and communicates corresponding steering angle data to the individual axle control units.

The central control module can output central module data to a vehicle control or to its subsystems via the control interface or a further interface. Status information and/or error messages can e.g. be transmitted from the central control module to the vehicle or to its vehicle control. It is furthermore possible that braking, speed, and/or power demands are output by the central control module that are e.g. processed as part of the braking and/or engine control of the vehicle. The total control of the vehicle can thus also be influenced by the central control module. A speed restriction can e.g. be specified by the central control module in an error event.

In accordance with an embodiment, the steerable axle units have axle devices comprising at least one steering actuator, at least one sensor, at least one hydraulic unit, and/or at least one electronic axle operation safety device, with the axle control unit of the steerable axle unit autonomously controlling and/or monitoring the axle devices. The information exchange between, for example, sensors and actuators of the axle unit itself takes place within the axle unit having the axle control unit without this information necessarily having to be transmitted to the central control module via the data line. The axle control unit, however, determines actual data, in particular via the current steering angle, that are provided to the central control module over the data line. If, for example, the axle control unit receives a specification of desired steering angle data by the central control module, the axle control unit can thus carry out the activation of the axle unit by means of communication with the sensors and with the actuators of the axle unit, in particular with the hydraulic unit and/or the steering actuator, so that finally actual steering angle information being adopted can be communicated back to the central control module via the data interface of the axle control unit. A feedback loop can thus be set up in which a cycled querying of the actual steering angle data by the axle control units takes place, with the actual steering angle data being processed in a corresponding program in the central control module. The feedback loop here also includes the output of desired steering angle data to the axle control units to determine correction values and to carry out corresponding corrections. The periodically repeated determination of correction values and triggering of such corrections finally results in a carrying out of the corresponding steering angle setting sets that every axle unit individually, with the settings being monitored by the central control module.

Provision is in particular made for the increasing of the functional safety that the axle control unit has at least two processing units configured and operable as redundant with respect to one another; the central control module can in particular also have at least two, and preferably three, central processing units configured and operable as redundant with respect to one another. Alternatively or additionally, provision can be made for the increasing of the functional safety of the steering control system that the data line and the respective data interfaces of the axle control units have data transmission means configured as redundant with respect to one another. The system is thus in particular set up such that comparison analyses can be performed with respect to the central processing units of the central control module and with respect to the processing units of the axle control units. On a deviation of the determined information from the individual processing units or from the individual central processing units from one another, a repeat check of the plausibility of the information can take place, which in particular becomes possible with the redundantly adapted and operated units. It is in particular advantageous in this respect if the processing units of the axle control unit or the central processing units of the central control module have different hardware configurations to preclude systemic error influences. As a result, a steering control system can be provided that satisfies the ASIL-D standard.

To increase the operating safety of the steering control system, the central control module in particular has one or more monitoring means by which the plausibility of the actual steering angle data communicated by the axle control units is monitored. It is equally possible that every axle control unit preferably has one or more monitoring means by which the plausibility of the desired steering angle data communicated by the central control module is monitored. The monitoring means can comprise microcontrollers in which comparison data are stored, with the microcontrollers comparing the actual steering angle data and the desired steering angle data with the comparison data. If, for example, a piece of steering angle information of the actual data or of the desired data is outside a plausibility range, a comparison with the remaining information can be made by the monitoring means, to this extent with the comparison data that are provided by the other processing units of the axle control unit or by the other remaining central processing units of the central control module.

The vehicle parts are typically connected to one another by joints. The joints can have joint control devices that can likewise be connected to the data line and be in data exchange with the central control module. The joints can in particular have angle sensors by which joint angle information are detected and transmitted to the central control module. For an even further increase of operating safety, the joint angle information can be detected independently thereof by the joint control device. A plausibility comparison of the joint angle information thus detected can in particular be carried out with the joint angle information of the central control module. In another respect, there is also the possibility of supplying the joint angle information from the joints between the vehicle parts to the central control module to determine the desired steering angle data.

The central control module further advantageously has a software-based vehicle-specific movement model that is configured to determine the axle-specific desired steering angle data for output to each of the axle control units on the basis of the vehicle-specific movement model. The vehicle-specific movement model is here based on vehicle data, in particular on the dimensions and/or mass of the vehicle, on axle data such as axle loads and/or the number of steerable and non-steerable axle units, and/or on joint data such as the joint angles and/or the number of joints.

The invention is further directed to a multi-unit vehicle having a plurality of vehicle parts movably connected to one another and a plurality of steerable axle units and having a steering control system for controlling the steering of the multi-unit vehicle, wherein the steering control system has a first axle control unit that is arranged in conjunction with a first steerable axle unit and has at least one second axle control unit that is arranged in conjunction with at least one second steerable axle unit. The steering control system here in particular has a central control module that is connected to the plurality of axle control units via a common data line for the exchange of steering angle data, with the axle control units having data interfaces for communication via the data line, said data interfaces being configured for the transfer of mutually identical data formats, whereby the steering control system is set up in a modular manner with a variable number of axle control units that can be integrated.

The statements on the steering control system in accordance with the invention apply accordingly with respect to preferred embodiments of the multi-unit vehicle.

The invention further relates to a method of setting up a steering control system that is adapted to control the steering of a multi-unit vehicle having a plurality of vehicle parts movably connected to one another and a plurality of steerable axle units, wherein the method comprises at least the following steps: modular arrangement of a first axle control unit in conjunction with a first steerable axle unit; modular arrangement of at least one second axle control unit in conjunction with at least one second steerable axle unit, with the axle control units being configured as exchangeable with one another with respect to their connection to a data line; and wherein a central control module is adapted that exchanges steering information with the axle control units over the data line, with the axle control units being operated independently of one another and independently of their number on the putting into operation of the steering control system in that they communicate with a central control module over the common data line.

The method is in particular characterized in that the axle control units exclusively communicate with the central control module. I.e. in that the axle control units—unlike as known from the prior art—for the steering of the axle units do not exchange information directly with one another and use it directly for the steering of the axle units. Information provided from the axle control units is rather only processed in the central control module or is forwarded by it for processing. At the same time, only the data provided by the central control module are used in the axle units for the steering of the axle units.

Provision is furthermore made that axle-specific actual steering angle data are communicated from each of the axle control units to the central control module and/or that axle-specific desired steering angle data are communicated from the central control module to each of the axle control units.

Within the framework of the invention, the method can in particular provide that the vehicle parts are connected to one another via joints, with the joints each having joint control devices that communicate joint data to the central control module that comprise at least one of the following pieces of information: steering angle data, damping data, kink angle data, transverse offset data, transverse force data.

The statements on the steering control system in accordance with the invention apply accordingly with respect to preferred embodiments of the method in accordance with the invention and to the multi-unit vehicle.

Advantageous further developments of the invention result from the description and the drawings. The advantages named in the description of features and of combinations of a plurality of features are only exemplary and can come into effect alternatively or cumulatively without the advantages of embodiments in accordance with the invention necessarily having to be achieved. The features named in the claims and in the description are to be understood with respect to their number that exactly this number or a larger number than said number is present without this requiring an explicit use of the term "at least". If therefore, for example, a data interface is spoken of, it is to be understood such that exactly one data interface, two data interfaces, or a plurality of data interfaces is/are present. These features can be supplemented by other features or can be the only features the respective product consists of. The reference numerals contained in the claims do not represent any restriction of the scope of the subjects protected by the claims. They only serve the purpose of making the claims easier to understand.

BRIEF DESCRIPTION OF THE DRAWINGS

Further measures improving the invention will be shown in more detail below together with the description of preferred embodiments of the invention with reference to the Figures. There are shown.

DETAILED DESCRIPTION OF THE INVENTION

Figure 1:
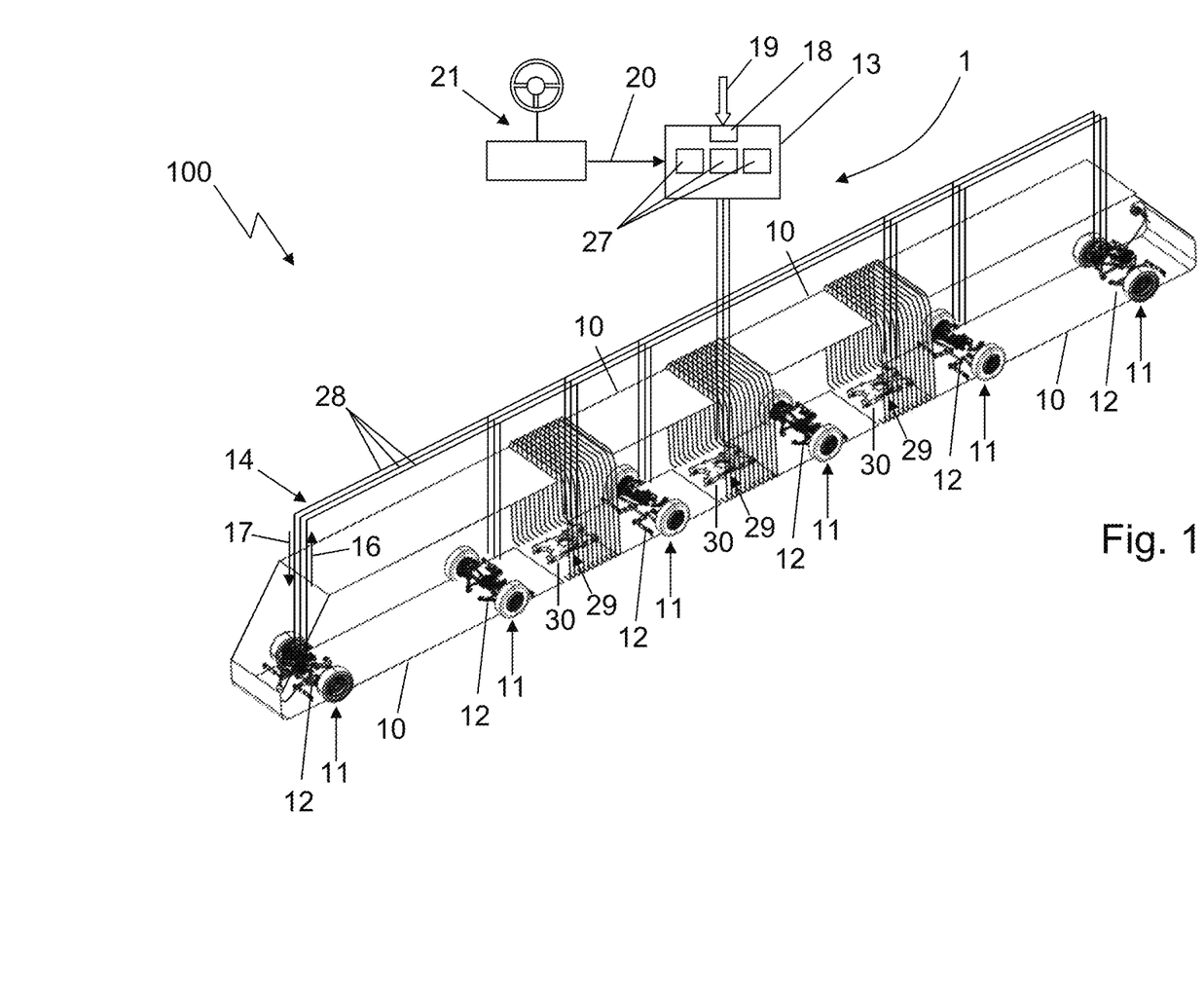
FIG. 1 is a schematic view of a vehicle with a plurality of axle units and with a steering control system for controlling the axle units.

The vehicle 100 shown in FIG. 1 is designed in the manner of a so-called streetcar on wheels. The vehicle 100 has a plurality of vehicle parts 10 and the individual vehicle parts 10 have one or more axle units 11. The vehicle parts 10 are connected to one another by means of joints 29. Such vehicles 100 can have particularly large lengths and are built up of a plurality of vehicle parts 10.

A steering control system 1 is shown in a schematic representation that serves the articulated connection of the plurality of axle control units 12 to the axle units 11. If the vehicle 100 is set into motion, every axle unit 11 has to adopt a steering angle that has to be calculated in advance to travel along a desired trajectory without individual axle units 11 traveling out of the trajectory, whereby the vehicle becomes unfit to drive in the worst case. A control system of the vehicle 100 is required for this purpose whose setup will be described in more detail in the following.

The steering control system 1 has a central control module 13 that is connected to the axle control units 12 of the axle units 11 for the exchange of steering angle data over a common data line 14. The data line 14 has a plurality of data transmission means 28 arranged in parallel to form redundancy. For a further increase of operating safety, the central control module 13 has a plurality of central processing units 27 that are independent of one another and that are only shown schematically.

Travel data 19 can be supplied to the central control module 13 via a control interface 18, with the travel data 19 relating, for example, to the direction of travel and to the travel speed of the vehicle 100. Steering information 20 is furthermore supplied to the central control module 13 that is provided via a steering device 21 and that likewise forms travel data. The steering device 21 can be operated in a manner known per se by an operator of the vehicle 100 or the steering device 21 relates to an autonomous drive device of the vehicle 100.

The steering information exchanged over the data line 14 between the axle control units 12 and the central control module 13 relate to actual steering angle data that are communicated from the axle control units 12 to the central control module 13 and the data relate to desired steering angle data 17 that are communicated to the axle control units 12 from the central control module 13. The joints 29 furthermore have joint control units 30 that are likewise in data exchange with the data line 14 and to this extent with the central control module 13.

Figure 2:
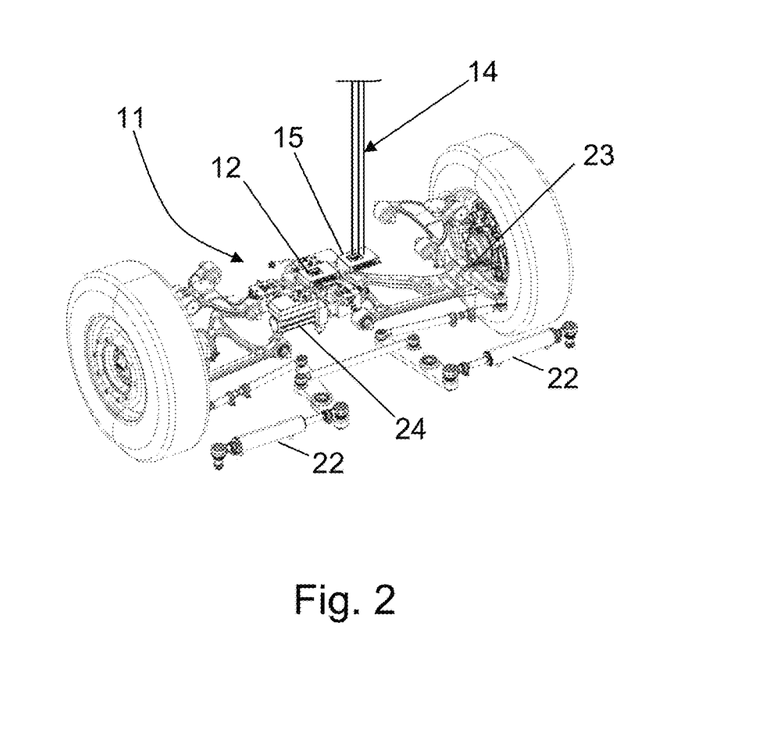
FIG. 2 is a perspective view of an axle unit with an axle control unit.
Figure 3:
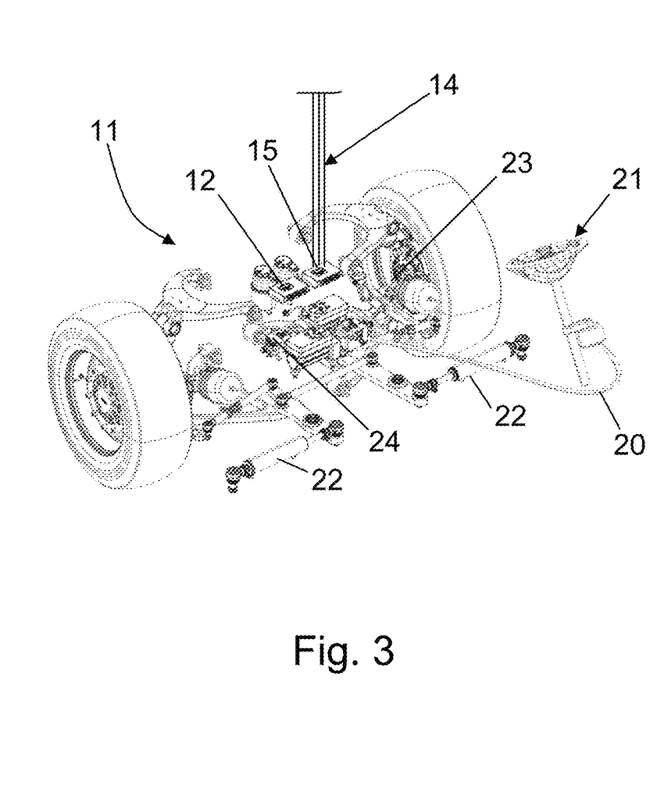
FIG. 3 is a perspective view of an axle unit with an axle control unit and with a steering device.

FIGS. 2 and 3 show examples of axle units 11, with the axle unit 11 in accordance with FIG. 3 having a steering device 21 and thereby differing from the axle unit 11 in accordance with FIG. 2.

The axle units 11 have an axle control unit 12 as a major component that has a data interface 15. The data interface 15 is connected to the data line 14 for the purpose of data communication. The axle control units 12 are connected to devices of the axle unit 11 of which a plurality of sensors and actuators are shown in a non-exclusive manner. The axle units 11, for example, have steering actuators 22 that can be controlled via the axle control unit 12, with a current steering angle of the axle unit 11, for example, being able to be detected via sensors 23 and being able to be processed by the axle control unit 12. A hydraulic unit 24 via which the steering actuators 22 can be driven is a further component of the axle units 11, for example.

The axle control unit 12 is connected to the data interface 15 that supplies the steering angle data to the central control module, not shown, over the data line 14 and that receives corresponding steering angle data from the central control module.

FIG. 3 shows an axle unit 11 that can be arranged, for example, at a front or at a rear end of the vehicle 100. The axle unit 11 has a steering device 21 that communicates steering information 20 to the axle control unit 12. An operator or an autonomous driving system can specify a route therewith along which the vehicle 100 should drive.

Figure 4:
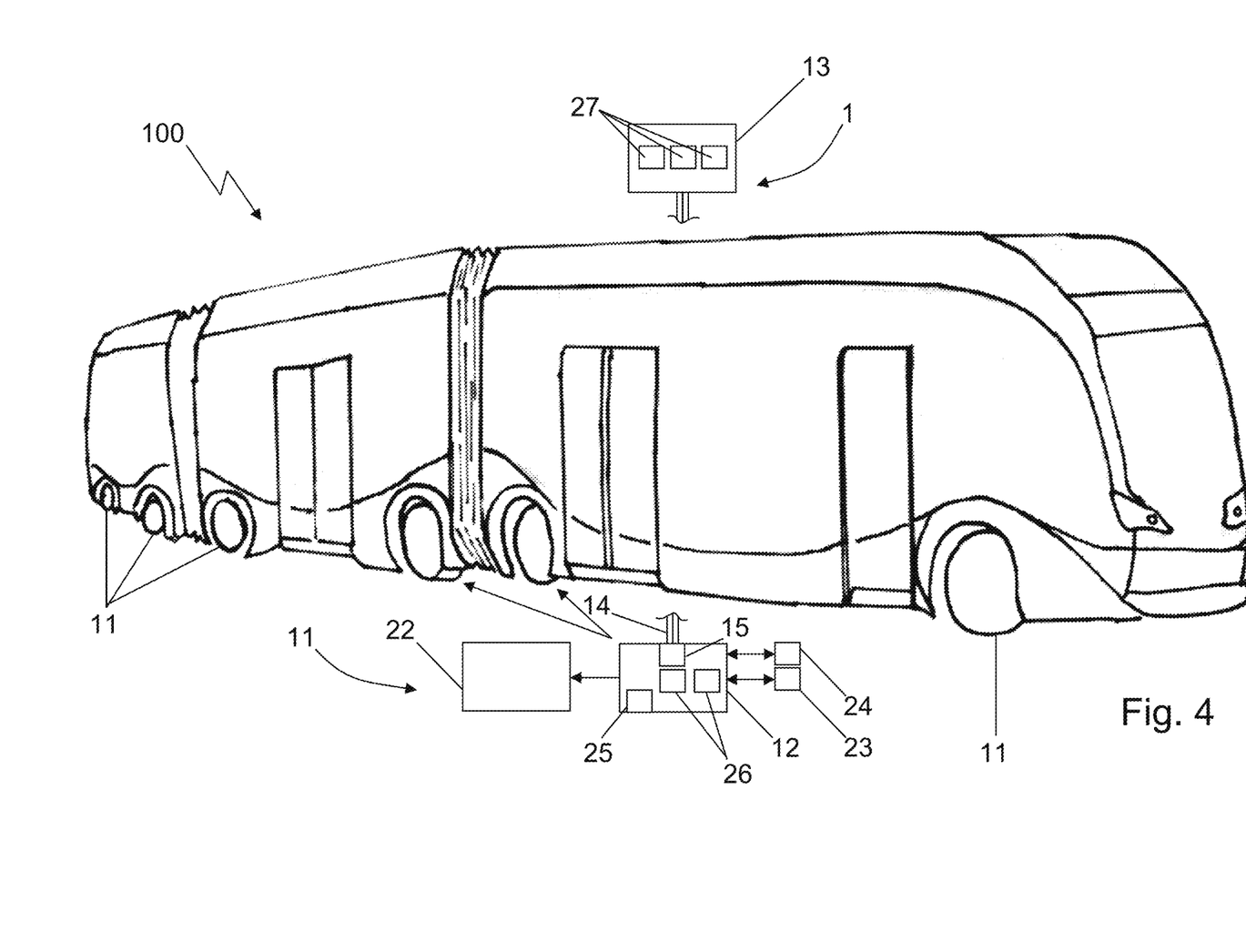
FIG. 4 is a further schematic view of the vehicle with a steering control system having a central control module with only one axle control unit shown by way of example.

FIG. 4 finally shows the steering control system 1 in conjunction with the vehicle 100 in a further schematic view. The vehicle 100 is shown with the plurality of axle units 11, with one axle unit 11 with the associated components thereof being shown magnified in a schematic manner. The central control module 13 is shown above the vehicle 100, with a data line 14 being schematically indicated between the central control module 13 and the axle unit 11. The axle unit 11 shown is to this extent present multiple times to form the steering control system 1 together with the central control module 13.

The axle unit 11 has as a major electronic component the axle control unit 12 that is connected to the data line 14 via the data interface 15.

The central control module 13 in the embodiment shown is set up on the basis of three central processing units 27 that can be designed as identical to one another in construction or that in particular each have hardware differing from one another, with the central processing units 27 being operated next to one another and in particular independently of one another. The operating safety can be increased even further with different hardware, with the software-based, vehicle-specific movement model being able to be installed and operated on each of the central processing units 27 so that a very high operating safety of the central control module 13 is achieved with three central processing units 27 present and with the redundancy accompanied thereby. Within the framework of the invention, the central control module 13 can also be configured and set up on only one single central processing unit 27 or on two central processing units 27 or more than three central processing units 27.

The axle unit 11 has the axle control unit 12 that is set up by way of example on the basis of two processing units 26 that can be redundantly operated in the same manner. The shown two processing units 26 for forming the axle control unit 12 can also have different hardware configurations or they are configured as identical with one another. If steering information is exchanged with the central control module 13 over the data line 14, the plausibility of the exchanged data can be monitored by an axle operating safety device 25.

The axle unit 11, for example, has a steering actuator 22 for performing the steering movement of the wheels, a sensor 23 for detecting a current steering angle of the wheels, and a hydraulic unit 24, with all the peripheral devices preferably being controlled by the axle control unit 12.

The invention is not restricted in its design to the preferred embodiment specified above. A number of variants is rather conceivable that also makes use of the solution shown with generally differently designed embodiments. All the features and/or advantages, including any construction details or spatial arrangements, originating from the claims, the description or the drawings can be essential to the invention both per se and in the most varied combinations.

The invention claimed is:

1. A steering control system for controlling the steering of a multi-unit vehicle having a plurality of vehicle parts movably connected to one another and having a plurality of steerable axle units, comprising:
   a first axle control unit for arrangement in conjunction with a first steerable axle unit;
   at least one second axle control unit for arrangement in conjunction with at least one second steerable axle unit;
   a central control module connected to the axle control units via a common data line for the exchange of steering angle data; and
   the axle control units each having a data interface for communication over the data line, said data interfaces being configured for transmitting data formats that are identical to one another, whereby the steering control system is configured to be set up in modular form with a variable number of axle control units that can be integrated, wherein the central control module has a software-based vehicle-specific movement model that is configured to determine axle-specific desired steering angle data for outputting to each of the axle control units on a basis of the vehicle-specific movement model, with the vehicle-specific movement model being based on vehicle data, the vehicle data comprising dimensions and/or mass of the vehicle.

2. A steering control system in accordance with claim 1, wherein the axle control units are configured as identical to one another in a construction and electronic manner and/or are operable independently of one another.

3. A steering control system in accordance with claim 1, wherein axle-specific actual steering angle data is communicated from each of the axle control units to the central control module and axle-specific desired steering angle data is communicated from the central control module to each of the axle control units.

4. A steering control system in accordance with claim 1, wherein:
   the central control module has a control interface via which travel data of the vehicle is communicated to the central control module, with the travel data comprising at least a travel speed, a direction of travel, and/or steering information;
   a steering device controlled by an operator and/or by an autonomous driving device of the vehicle provides the steering information; and/or
   the central control module has a control interface for transmitting central control module data to a vehicle control, with the central control module data comprising status information and/or braking, speed, and/or power information.

5. A steering control system in accordance with claim 1, wherein the steerable axle units each have an axle device comprising at least one steering actuator, at least one sensor, at least one hydraulic unit, and/or at least one electronic axle operation safety device, with the axle control unit of each steerable axle unit autonomously controlling and/or monitoring the respective axle device.

6. A steering control system in accordance with claim 1, wherein each axle control unit has at least two processing units that are configured as redundant with respect to one another;

and/or the central control module has at least two central processing units configured as redundant with respect to one another.

7. A steering control system in accordance with claim 1, wherein the common data line and the respective data interface of the axle control units have data transmission means configured as redundant with respect to one another.

8. A steering control system in accordance with claim 3, wherein the central control module has at least one monitoring means with which a plausibility of the actual steering angle data communicated from the axle control units is monitored; and/or the axle control units have at least one monitoring means with which a plausibility of a desired steering angle data communicated from the central control module is monitored.

9. A steering control system in accordance with claim 1, wherein the vehicle parts are connected to one another via joints, with the joints having joint control devices that are connected to the data line and are in data exchange with the central control module, to transmit joint angle information detectable by angle sensors at the joints to the central control module.

10. A steering control system in accordance with claim 1, wherein the vehicle data further comprises:

axle data, at least comprising axle loads and/or a number of steerable and/or non-steerable axle units;

joint data comprising joint angles and/or a number of joints; or any combination thereof.

11. A multi-unit vehicle having a plurality of vehicle parts movably connected to one another and a plurality of steerable axle units, and having a steering control system for controlling steering of the multi-unit vehicle, wherein the steering control system comprises:

a first axle control unit that is arranged in conjunction with a first steerable axle unit;

at least one second axle control unit that is arranged in conjunction with at least one second steerable axle unit; and a central control module that is connected to the axle control units via a common data line for the exchange of steering angle data, with the axle control units each having a data interface for communication via the data line, said data interfaces being configured for transfer of mutually identical data formats, whereby the steering control system is set up in a modular manner with a variable number of axle control units that can be integrated, wherein the central control module has a software-based vehicle-specific movement model that is configured to determine axle-specific desired steering angle data for outputting to each of the axle control units on a basis of the vehicle-specific movement model, with the vehicle-specific movement model being based on vehicle data, the vehicle data comprising dimensions and/or mass of the vehicle.

12. A method of setting up a steering control system that is adapted to control steering of a multi-unit vehicle having a plurality of vehicle parts movably connected to one another and a plurality of steerable axle units, the method comprising:

a modular arrangement of a first axle control unit in conjunction with a first steerable axle unit; and a modular arrangement of at least one second axle control unit in conjunction with at least one second steerable axle unit;

wherein the axle control units are configured as exchangeable with one another with respect to a connection of each of the axle control units to a data line; and wherein a central control module is configured that exchanges steering information with the axle control units over the data line; wherein on the putting into operation of the steering control system, the axle control units are operated independently of one another and independently of their number in that they communicate with the central control module over the common data line, wherein the central control module has a software-based vehicle-specific movement model that is configured to determine axle-specific desired steering angle data for outputting to each of the axle control units on a basis of the vehicle-specific movement model, with the vehicle-specific movement model being based on vehicle data, the vehicle data comprising dimensions and/or mass of the vehicle.

13. A method in accordance with claim 12, wherein the axle control units each communicate exclusively with the central control module.

14. A method in accordance with claim 12, wherein:

axle-specific actual steering angle data are communicated from each of the axle control units to the central control module and/or axle-specific desired steering angle data are communicated from the central control module to each of the axle control units.

15. A method in accordance with one of the claim 12, wherein the vehicle parts are connected to one another via joints, with the joints each having joint control devices that communicate joint data to the central control module, the joint data comprising at least one of the following pieces of information: steering angle data, damping data, kink angle data, transverse offset data, transverse force data.

* * * * *